(12) United States Patent
Diehl et al.

(10) Patent No.: US 9,255,596 B2
(45) Date of Patent: Feb. 9, 2016

(54) RIVET ELEMENT

(75) Inventors: Oliver Diehl, Bad Homburg v.d.H. (DE); Richard Humpert, Bad Nauheim (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 165 days.

(21) Appl. No.: 13/610,300

(22) Filed: Sep. 11, 2012

(65) Prior Publication Data

US 2013/0078050 A1 Mar. 28, 2013

(51) Int. Cl.
| | |
|---|---|
| *F16B 13/04* | (2006.01) |
| *F16B 19/08* | (2006.01) |
| *B21J 15/02* | (2006.01) |
| *F16B 19/10* | (2006.01) |
| *F16B 37/06* | (2006.01) |
| *B21J 15/14* | (2006.01) |
| *B23P 19/06* | (2006.01) |
| *B29C 65/60* | (2006.01) |
| *B29C 65/00* | (2006.01) |

(52) U.S. Cl.
CPC .................. *F16B 19/08* (2013.01); *B21J 15/02* (2013.01); *B21J 15/025* (2013.01); *B21J 15/147* (2013.01); *B23P 19/062* (2013.01); *B29C 65/607* (2013.01); *B29C 66/474* (2013.01); *B29C 66/721* (2013.01); *B29C 66/81429* (2013.01); *B29C 66/8322* (2013.01); *F16B 19/10* (2013.01); *F16B 19/1027* (2013.01); *F16B 37/065* (2013.01); *B29C 66/72141* (2013.01); *B29C 66/72143* (2013.01); *Y10T 29/49956* (2015.01)

(58) Field of Classification Search
CPC .... F16B 19/08; F16B 37/065; F16B 19/1027; F16B 19/10
USPC ............... 411/15, 30, 38, 34, 54.1, 103, 57.1, 411/108, 80.1, 113, 175, 176, 179, 183, 411/184, 188, 501–503; 29/525.06
IPC ............................................. F16B 13/063, 5/04
See application file for complete search history.

(56) References Cited

U.S. PATENT DOCUMENTS

| | | | | |
|---|---|---|---|---|
| 1,108,483 | A | * | 8/1914 | Abramson .................... 411/448 |
| 1,130,962 | A | | 3/1915 | Cobb |
| 1,180,962 | A | * | 4/1916 | Cobb ............................ 180/215 |
| 3,217,584 | A | * | 11/1965 | Amesbury .................... 411/508 |

(Continued)

FOREIGN PATENT DOCUMENTS

| | | |
|---|---|---|
| CN | 101379305 A | 3/2009 |
| DE | 20 45 764 A | 3/1972 |

(Continued)

OTHER PUBLICATIONS

German Search Report in corresponding German Patent Application No. 10 2011 113 436.4 dated Jul. 10, 2012.

(Continued)

*Primary Examiner* — Gary Estremsky
(74) *Attorney, Agent, or Firm* — Hershkovitz & Associates, PLLC; Abraham Hershkovitz; Eugene Rzucidlo

(57) ABSTRACT

The invention relates to a rivet element, in particular for attachment to components of fiber composite materials, having a rivet section which is formed at least regionally as a spike which tapers in the direction towards a tip and which can be dilated by means of a die button.

12 Claims, 5 Drawing Sheets

(56) References Cited

U.S. PATENT DOCUMENTS

| | | | |
|---|---|---|---|
| 3,318,183 A * | 5/1967 | Fischer | 411/80.1 |
| 3,403,958 A * | 10/1968 | Gross | 351/153 |
| 3,728,761 A * | 4/1973 | Holly | 411/80.1 |
| 3,750,518 A | 8/1973 | Rayburn | |
| 3,778,755 A * | 12/1973 | Marks | 439/853 |
| 3,918,130 A * | 11/1975 | Poe | 24/453 |
| 4,216,697 A * | 8/1980 | Wilson | 411/15 |
| 4,263,833 A * | 4/1981 | Loudin et al. | 411/41 |
| 4,897,003 A * | 1/1990 | Bradley et al. | 411/43 |
| 5,108,308 A * | 4/1992 | Northcraft et al. | 439/555 |
| 5,480,403 A * | 1/1996 | Lee et al. | 606/232 |
| 5,846,040 A * | 12/1998 | Ueno | 411/45 |
| 6,196,778 B1 * | 3/2001 | Wakai | 411/42 |
| 7,074,203 B1 * | 7/2006 | Johanson et al. | 602/72 |
| 8,162,577 B2 * | 4/2012 | Moore | 411/60.1 |
| 2004/0130932 A1 | 7/2004 | Ladouceur | |
| 2004/0247412 A1 | 12/2004 | Reck et al. | |
| 2009/0114662 A1 * | 5/2009 | Coyne et al. | 220/769 |
| 2011/0083390 A1 * | 4/2011 | Bui | 52/483.1 |

FOREIGN PATENT DOCUMENTS

| | | |
|---|---|---|
| DE | 30 03 908 A1 | 8/1981 |
| DE | 39 28 529 A1 | 3/1991 |
| DE | 101 30 681 | 1/2003 |
| DE | 698 29 477 T2 | 2/2006 |
| DE | 10 2006 007 708 A1 | 8/2007 |
| WO | 02/083357 A1 | 10/2002 |
| WO | WO 2009/029221 A1 | 3/2009 |

OTHER PUBLICATIONS

English language translation of German Search Report in corresponding German Patent Application No. 10 2011 113 436.4 dated Jul. 10, 2012.

European Search Report in corresponding European Patent Application No. 12 182 909.7 dated Nov. 19, 2012.

English language translation of European Search Report in corresponding European Patent Application No. 12 182 909.7 dated Nov. 19, 2012.

* cited by examiner

RIVET ELEMENT

FIELD OF THE INVENTION

The invention relates to a rivet element, to a component assembly of a rivet element and a component of fiber composite material, to a die button for the attachment of rivet elements and also to a method for the attachment of rivet elements in components of fiber composite material.

BACKGROUND OF THE INVENTION

For the attachment of fastener elements, such as in particular rivet elements to components of sheet metal or fiber composite materials, one previously assumed that it is necessary to form an opening in the component for the fastener element. For components of fiber composite materials in particular, a procedure of this kind is however associated with considerable disadvantages because discontinuities arise at openings in the material, which considerably weaken the material and indeed at positions where, as a result of the fastener elements, a particularly high material strength is actually required.

The object of the invention is thus to provide a possibility of attaching fastener elements, such as in particular rivet elements, to components in such a way that the components do not have to be weakened in a disadvantageous manner and indeed it should in particular be possible to attach fastener elements to components of fiber composite materials.

This object is satisfied by the invention by a rivet element having a rivet section (11) which tapers in the direction towards a tip which is formed at least regionally as a spike which tapers in the direction towards a tip and which can be dilated by means of a die button (31); by a component assembly comprising a component (51) of fiber composite material and a rivet element having a rivet section (11) which tapers in the direction towards a tip which is formed at least regionally as a spike which tapers in the direction towards a tip and which can be dilated by means of a die button (31); by a die button having a rivet section (11) which tapers in the direction towards a tip which is formed at least regionally as a spike which tapers in the direction towards a tip and which can be dilated by means of a die button (31), the die button having a dilation section (33) for the dilation of the spike of the rivet element, with the dilation section (33) being itself formed at least regionally as a spike which tapers in the direction of a tip; and also by a method for the attachment of a rivet element to a component (51) of the fiber composite material in which a rivet element and a die button (31) are each provided with a section formed as a spike, are pressed into a component (51) with the spike of the rivet element being dilated by means of the spike of the die button (31) for the formation of a rivet connection.

SUMMARY OF THE INVENTION

The rivet element in accordance with the invention includes a rivet section which is formed as a spike tapering in the direction of a tip and which can be at least regionally dilated by means of a die button.

By the formation of the rivet section as a dilatable spike it is possible to press the rivet element with the spike into the respective material, where-upon the spike can be dilated by means of a suitably shaped die button for the formation of a rivet connection.

For components which are manufactured of a material which enables a pressing in of the rivet section of this kind, at least in certain states of the material, it is consequently possible to dispense with the manufacturing of an opening for the rivet element. The rivet element of the invention is consequently particularly suitable for components of fiber composite materials which are at least for a time in a condition in which the material is sufficiently soft and/or "pasty". This will be explained in more detail in the following. A further advantage of the invention lies in the fact that it is not necessary to adhesively bond the fastener element to the component.

In a preferred design of the rivet element the rivet section has a plurality of segments, in particular of tongue-like shape, which jointly form the spike and which can be moved apart from one another during the dilation of the spike.

The segments can be connected together with an intentional material weakening being provided at the connection position points of intended fracture, for example by use of a smaller wall thickness. The dilation of the spike is in this case associated with a breaking apart of the spike in order to move segments apart from one another. As an alternative, the segments can be at least regionally unconnected and in this respect lie on one another, or be fractionally spaced from one another, so that in the starting condition they jointly form a spike serving for pressing into the component and can be subsequently be moved apart by means of the die button without the breaking open of material.

The component assembly in accordance with the invention includes a rivet element in accordance with the invention and also a component of fiber composite material. In particular, the component assembly is characterized in that the rivet section of the rivet element engages behind the component with a region which is folded at least once. In this way, a particularly good security can be achieved against relatively high press-out forces.

The attachment of rivet element in the component preferably takes place in such way that in the finished component excess material of the component surrounds the rivet element at the side opposite to the rivet section.

The die button in accordance with the invention serves for the attachment of rivet elements in accordance with the invention and includes a dilating section for the dilation of the spike of the rivet element, with the dilation section being itself at least regionally formed as a spike.

In this way the die button can first be pressed with its spike into the component before the cooperation of the rivet section and the die button begins, i.e. before the spike of the rivet section is dilated by means of the spike of the die button to manufacture the desired rivet connection.

In a particularly preferred embodiment of the method, provision is made that the pressing in of the rivet element and of the die button into the component takes place during the manufacture of the component. In this way, on the one hand, the attachment of the rivet element can take place in the context of the manufacture of the component. In this way it is in particular possible to simultaneously use the tools used for the manufacture of the component to bring about the pressing in of the rivet elements and of the die button and also to apply the forces required for the cooperation of the rivet element and the die button. On the other hand, the fact can be exploited that during the manufacture of components of fiber composite materials the material has, as a result of the process, at least for a period of time, a consistency which permits the pressing in of the spikes of the rivet element and of the die button and also permits the displacement of material required for the manufacture of the rivet connection.

The invention can advantageously be used both in connection with fiber composite materials with relatively short fibers and also with materials with relatively long fibers. Components with short fibers can be manufactured in an injection molding process. In this connection the material mixture can readily be molded so that the tools used for the manufacture of these components can simultaneously be used for the attachment of rivet elements. Fiber composite materials with long fibers can be manufactured by laminating, i.e. by the crosswise application of individual plies with directional fibers. For many plastic materials it is then possible, in a similar manner to the deep-drawing of sheet metal parts, to press the laminated parts under the action of heat by means of a tool into a specific shape. The presses that are used for this can then simultaneously be exploited to introduce the rivet element and the die button into the adequately soft composite material.

In both cases, i.e. both with short fiber material and also with long fiber material the circumstances is thus exploited that the rivet element of the invention and the die button of the invention can be pressed into the material which is adequately soft for at least a period of time as a result of the process.

Preferred further developments of the invention are set forth in the dependent claims, the description and also in the drawing.

DETAILED DESCRIPTION OF THE INVENTION

Figure 1:
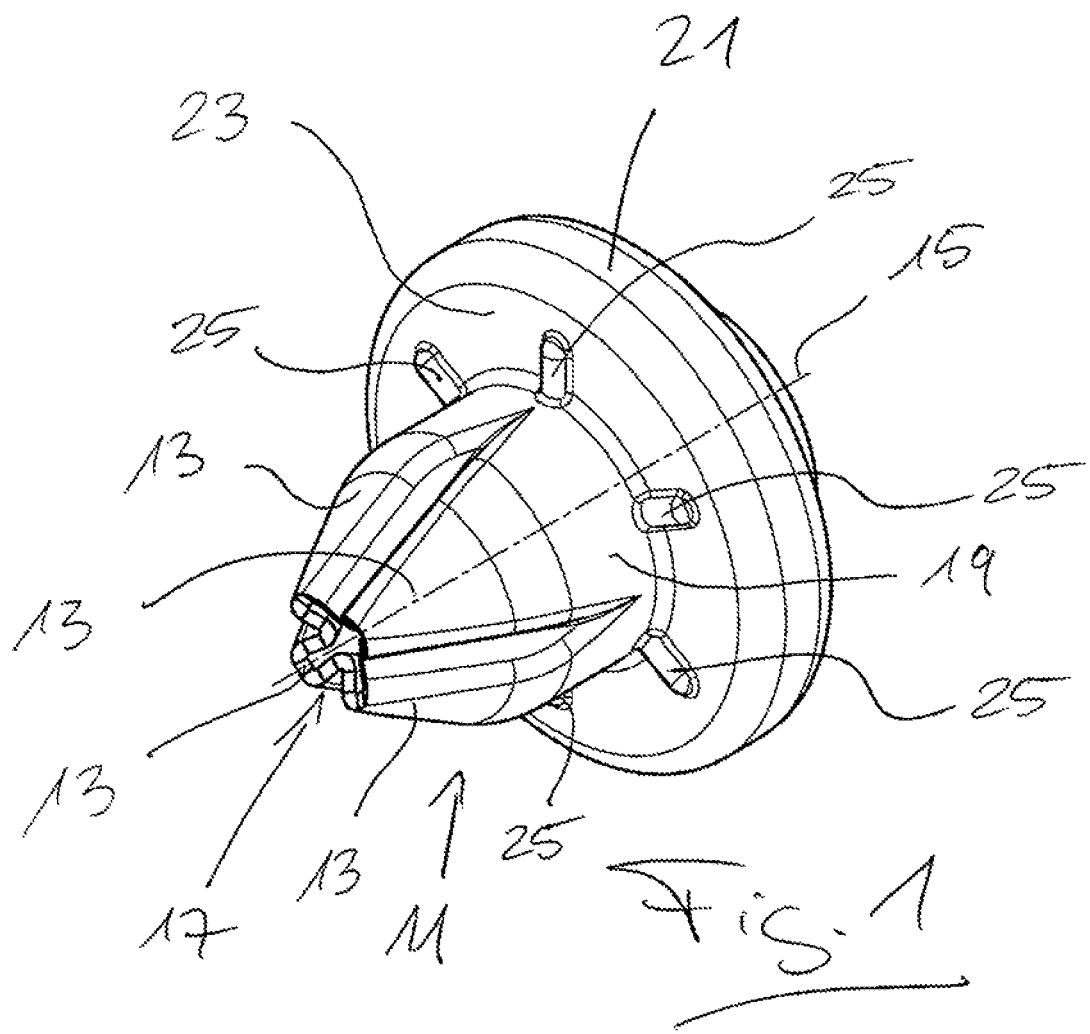
FIGS. 1 to 3 show different views of an embodiment of the rivet element in accordance with the invention.

The invention will be described in the following by way of example and with reference to the drawing, FIGS. 1 to 7 of which show different views on the rivet element in accordance with the invention and of the die button in accordance with the invention and also the course of a possible attachment of a rivet element in accordance with the invention to a component.

Figure 2:
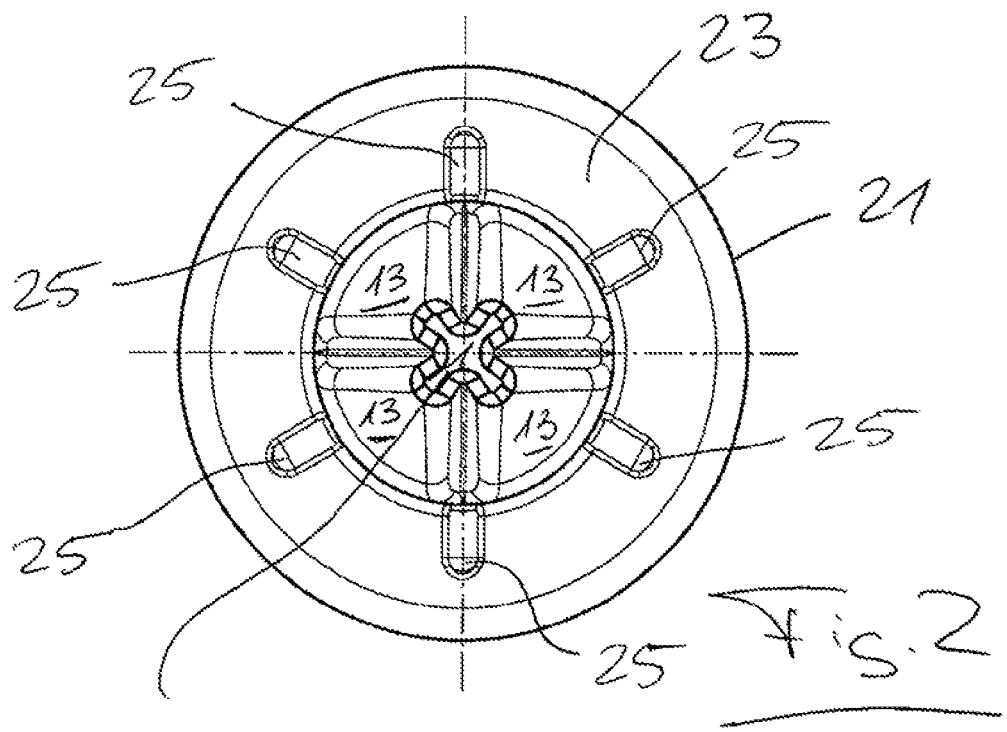
Figure 3:
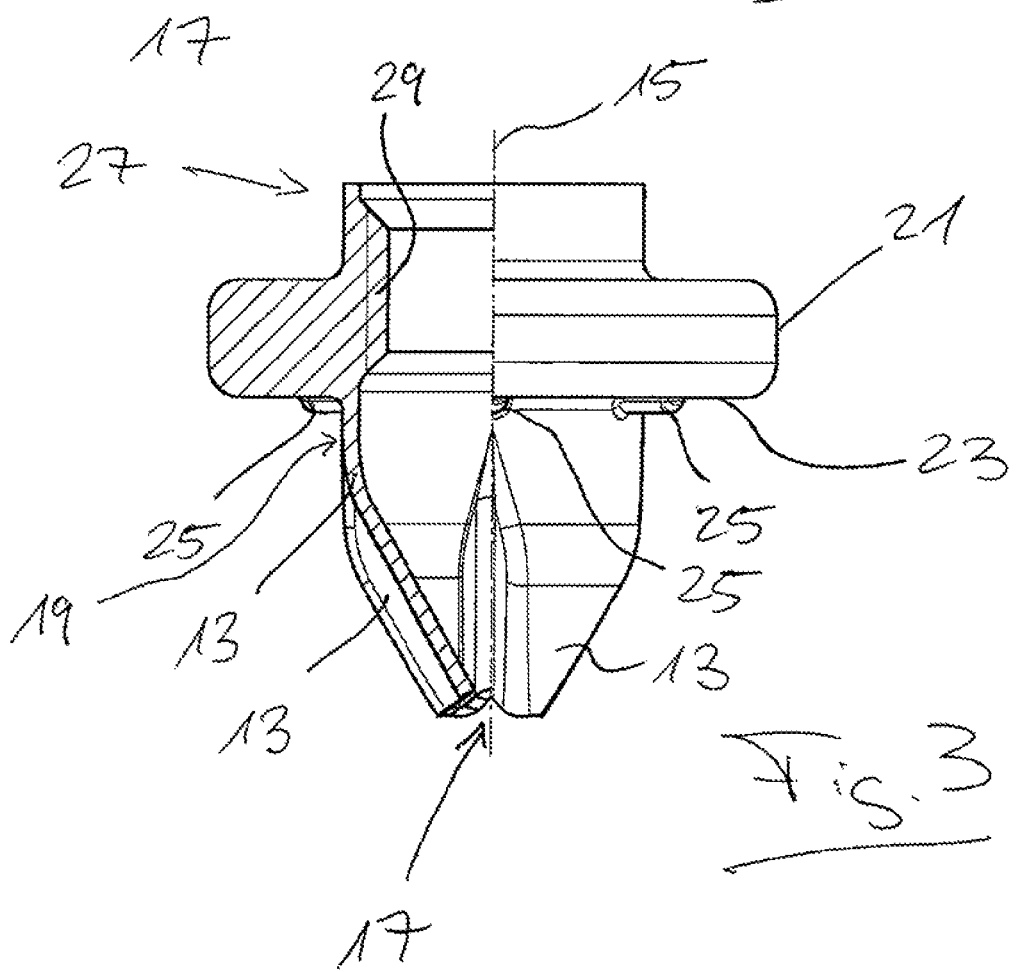
Figure 4:
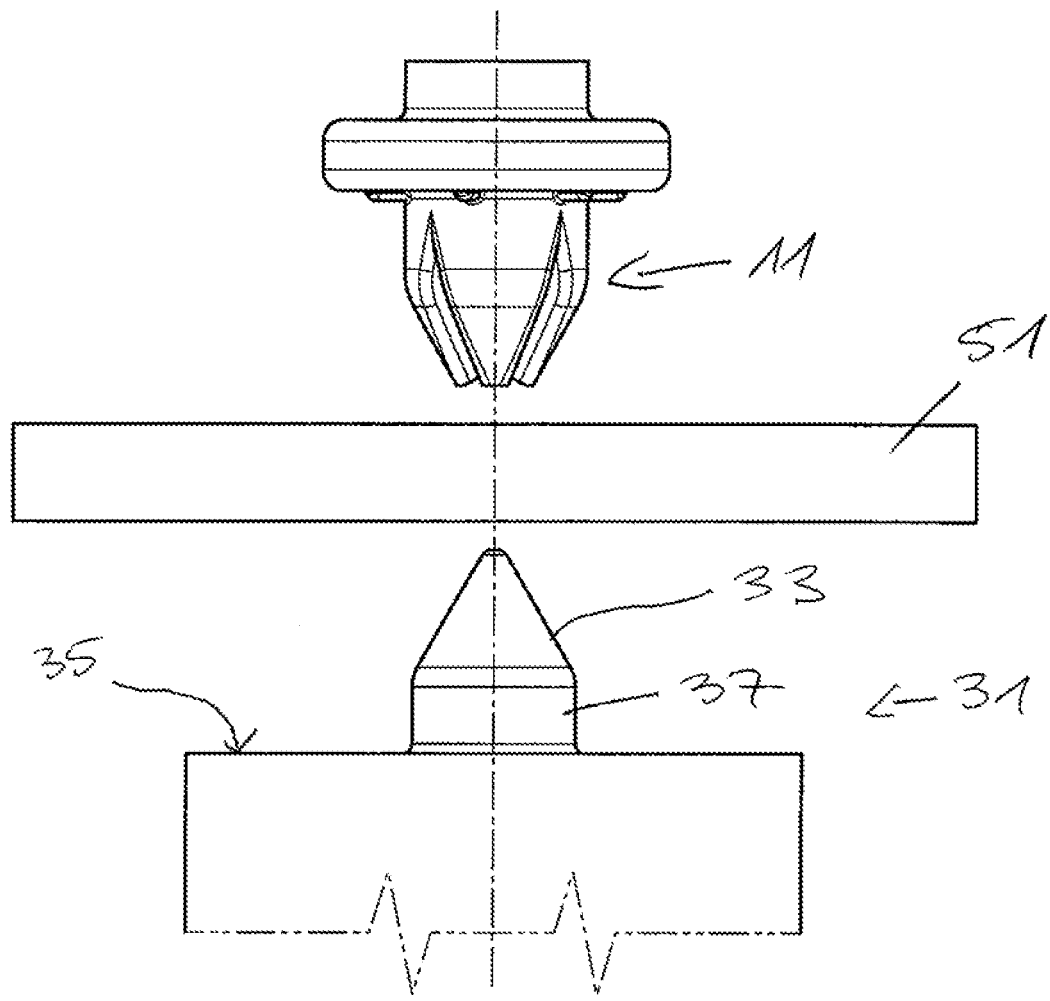
FIGS. 4-7 show a possible sequence for the attachment of a rivet element to a component 51 by means of a correspondingly shaped die button.

FIGS. 1 to 3 show different views of an embodiment of the rivet element in accordance with the invention.

The rivet element has a flange section 21 which extends radially with respect to a central axis 15 of the element. On the one side of the flange section 21 there is a fastener section 27 which is provided with an internal thread 29 which extends up to and into the flange portion 21.

In this embodiment the rivet element is consequently formed as a nut element. This is however not compulsory. In an alternative embodiment the rivet element in accordance with the invention can, for example, also be formed as a bolt element, which has a shaft is formed with an external thread as a fastener section.

The underside of the flange portion 21 remote from the fastener section 27 serves as a contact surface 23 for a component 51 (see in particular FIG. 6) to which the rivet element is to be attached. The contact surface 23 is provided with a plurality of projecting ribs 25 which extend in the radial direction and which serve as a security against rotation.

A rivet section 11 extends at the side of the flange portion 21 remote from the fastener section 27 and the outer diameter of the rivet section corresponds in the region of the contact surface 23 at least substantially to the outer diameter of the cylindrical fastener section 27.

Starting from flange portion 21, the rivet section 11 first has a substantially cylindrical portion 19 which merges into a spike tapering in the direction towards a tip or apex. At the tip of the spike there is funnel-shaped introduction aid 17 for a die button 31 (see in particular FIG. 5).

The rivet section 11 is formed by a plurality of tongue-like segments 13 which start from the flange section 21 and form the tapering spike of the rivet section 11 in the manner of a closed bud. The four segments 13 in this embodiment are consequently designed in such a way that they become narrower along the central axis 15 in the direction of the tip starting from the flange portion 21.

As mentioned in the introductory part the segments 13 can be connected to one another or for example can simply be unconnected while contacting one another.

The spike of the rivet element makes it possible to press the rivet element into an adequately soft component to which the rivet element is to be attached without it being necessary to (first) form an opening for the rivet element in the component.

A possible sequence for the attachment of a rivet element to a component 51 by means of a correspondingly shaped die button is shown in FIGS. 4 to 7.

The die button 31 includes a portion 33 for the dilation of the spike of the rivet element, with this portion 33 of the die button likewise having a portion forming a spike, which in this embodiment is of circular conical shape. As a consequence, the die button 31 in accordance with the invention is able to be pressed with its spike into the component.

A cylindrical section 37 is formed between a flat surface 35 of the die button 31 extending perpendicular to the central axis of the spike and the spike.

Figure 5:
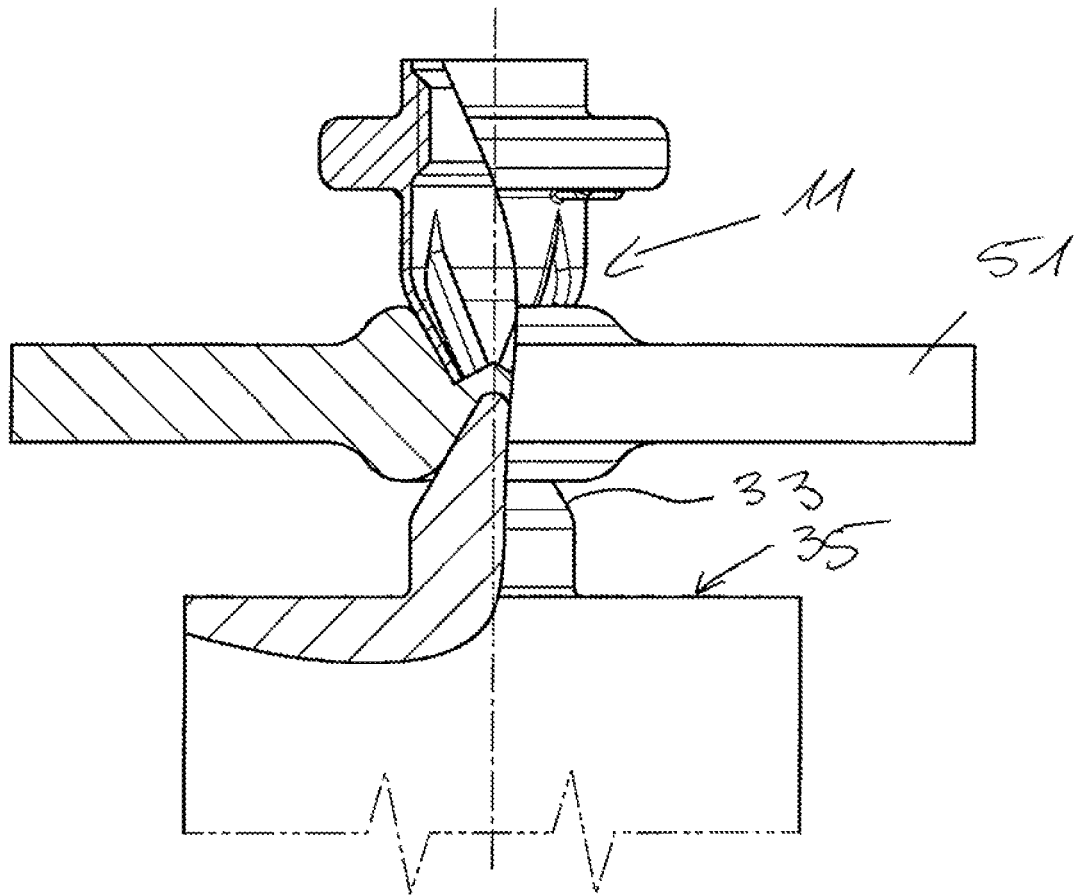

FIG. 5 shows a state in which both the spike of the rivet elements and also the spike of the die button 31 are pressed into the component 51, the dilation section 33 of the die button 31 has however not yet started to dilate the spike of the rivet element.

Figure 6:
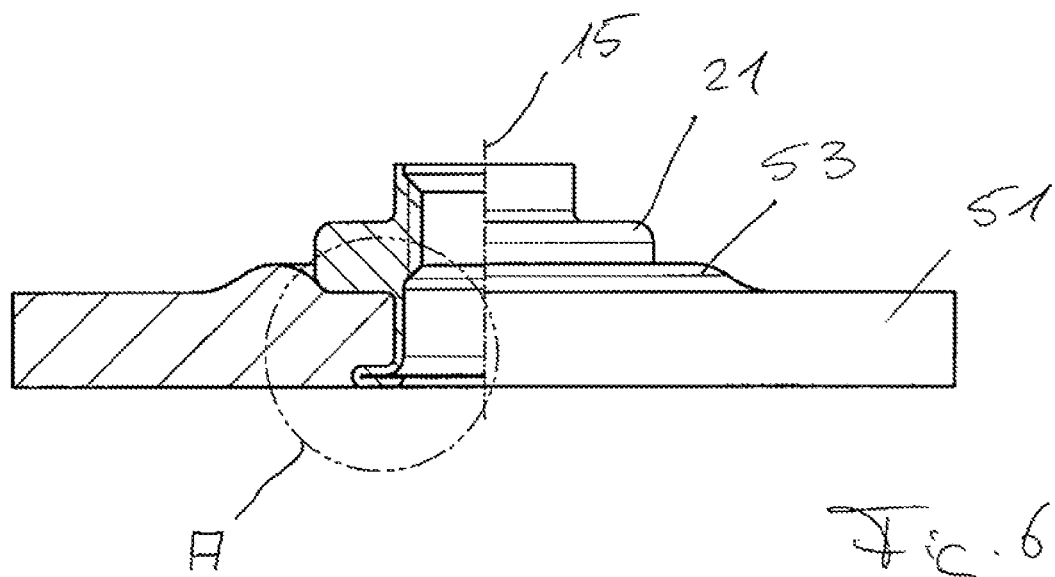
Figure 7:
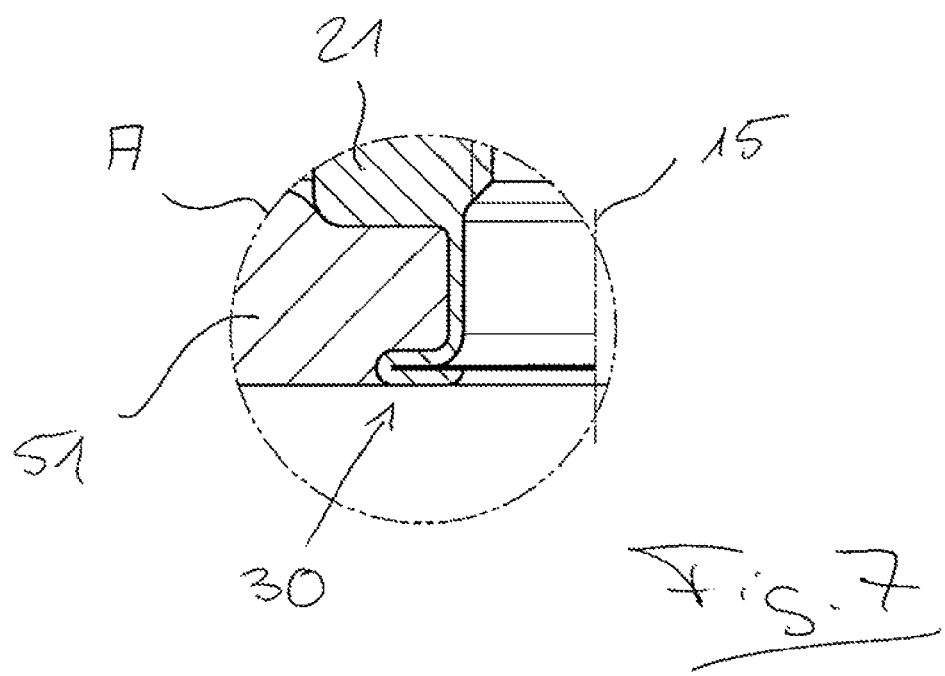

In total, the die button is shaped, in particular with respect to the diameter and angular relationships in correspondence with the rivet section of the rivet element in such a way that the end state shown in FIG. 6 results. Through the collaboration with the die button the spike of the rivet section 11 of the rivet element is dilated whereby the segments 13, on the one hand, move apart from one another and, on the other hand, are folded, so that a folded rivet bead 30 results at the lower side of the component. In the illustrated embodiment this rivet bead lies flush with the underside of the component 51. This is, however, not essential, the rivet bead can, as an alternative, also project at the underside of the component 51.

As FIG. 6 shows, the material of the component 51 is displaced in such a way that excess material 53 projects circularly at the top side of the component 51 around the flange portion 21.

While the folded rivet 30 secures the rivet element against the press-out forces the flange portion 21 provides security against pull-out forces.

As already mentioned in the introductory part, the pressing in of the rivet element and of the die button 31 is, in particular, carried out with the aid of a tool which is used for the manufacture of the respective component 51. The introduction of the rivet elements in accordance with the invention can consequently take place in the context of the manufacturing process which is in any event taking place. This manufacturing process in particular requires the material to be at least hot and thus soft for a period of time so that the rivet element and the die button 31 can be pressed into the material.

The invention also makes it possible to attach rivet elements to components of fiber composite materials, also termed "organo sheets" without openings having been (previously) formed in the material for the rivet elements. Disadvantageous weakening of the material is hereby avoided in advantageous manner.

REFERENCE NUMERAL LIST 11 rivet section
13 segment
15 central axis
17 introduction aid
19 cylindrical section
21 flange portion
23 contact surface
25 means for providing security against rotation, rib
27 fastener section
29 internal thread
30 folded rivet bead
31 die button
33 dilation section
35 flat surface
37 cylindrical section
51 component
53 excess material

The invention claimed is:

1. A rivet element having a rivet section (11) and a fastener section which is provided with a thread, wherein the rivet section and the fastener section are integrally formed, and wherein the rivet element tapers in the direction towards a tip which is formed at least regionally as a spike which tapers in the direction towards the tip and which can be dilated by means of a die button (31) wherein the rivet element is adapted to be mounted to an unprepared component and wherein the spike has an introduction aid (17) for the die button (31) at its tip, wherein the rivet section (11) has a plurality of segments (13) which jointly form the spike and can be moved apart from one another during the dilation of the spike and wherein the rivet element segments are adapted to be folded to form a rivet bead at the lower side of the component.

2. The rivet element in accordance with claim 1 and adapted for attachment to a fiber composite material.

3. The rivet element in accordance with claim 1, wherein the rivet section (11) has a substantially circular cross-section.

4. The rivet element in accordance with claim 1, wherein the segments each have a shape resembling a tongue.

5. The rivet element in accordance with claim 1, wherein the segments (13) each become narrower along a central axis (15) in the direction of the tip of the spike.

6. The rivet element in accordance with claim 1, wherein the spike has a funnel-shaped introduction aid.

7. The rivet element in accordance with claim 1, wherein the rivet section (11) has an at least substantially cylindrical portion (19) which is followed by the spike.

8. The rivet element in accordance with claim 1, wherein the a flange section (21) is provided which projects radially relative to the rivet section (11) and which has a contact surface (23) for a component (51); wherein the fastener section extends up to and into the flange section; and wherein the fastener thread is an internal or an external thread.

9. The rivet element in accordance with claim 8, wherein the flange section (21) is provided with means (25) for providing security against rotation.

10. The rivet element in accordance with claim 9, wherein the means providing security against rotation comprises at least one rib.

11. The rivet element in accordance with claim 1 and in the form of a nut element.

12. A rivet element having a rivet section (11) and a fastener section which is provided with a thread, wherein the rivet element tapers in the direction towards a tip which is formed at least regionally as a spike which tapers in the direction towards a tip and which can be dilated by means of a die button (31) and the rivet element is adapted to be mounted to an unprepared component and the spike has an introduction aid (17) for the die button (31) at its tip, wherein the rivet section (11) has a plurality of segments (13) which jointly form the spike and can be moved apart from one another during the dilation of the spike and wherein the rivet element segments are adapted to be folded to form a rivet bead at the lower side of the component.

* * * * *